RESIN MIX

EPON 1031-B-80-68.2% (W)
DIAMINO DIPHENYL SULFONE 5.5% (W)
ACETONE 26.3% (W)

INVENTORS:
NORBERT E. METHVEN
EDWIN A. RICHARDSON
BY:
THEIR AGENT

INVENTORS:
NORBERT E. METHVEN
EDWIN A. RICHARDSON
BY: *George G. Pritzker*
THEIR AGENT

United States Patent Office 3,428,122
Patented Feb. 18, 1969

3,428,122
PRODUCTION OF FLUIDS BY CONSOLIDATION OF EARTH FRACTURES
Norbert E. Methven and Edwin A. Richardson, Houston, Tex., assignors to Shell Oil Company, New York, N.Y., a corporation of Delaware
Filed Nov. 25, 1966, Ser. No. 597,084
U.S. Cl. 166—295                          7 Claims
Int. Cl. E21b 33/138

ABSTRACT OF THE DISCLOSURE

A process of stabilizing fractures in soft rock formations under great depths and high temperature and pressure by injecting into said fracture a polymerizing resin capable of preventing the fracture from closing and causing embedment of the propping agents present therein.

---

Figure 1:
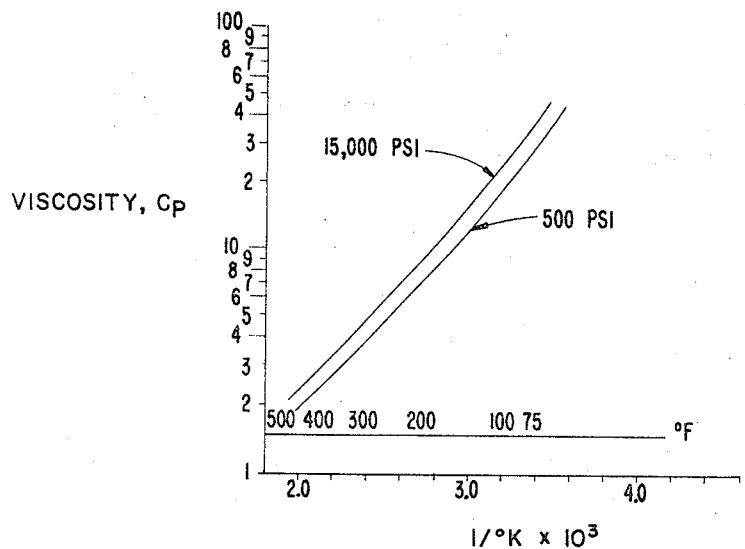

The present invention relates to the production of fluids from tight high-pressure reservoir formations and more particularly to improvement of fractures in underground formations by rendering them resistant to collapse and inhibiting embedment of fracture propping agents into the formation by permeating the fracture walls, preferably in a particular manner and with a novel permeable intergranular-bonding agent.

It is known in the art that partial recovery of fluids from impermeable reservoir formations can be accomplished with some degree of success by forming fractures in the production zone of the formation at desired depths, propping said fractures with suitable propping agents and thereafter recovering fluids therefrom by suitable means known to the art.

In tight high-pressured reservoirs from which it is desired to recover gas and/or liquids, the fracturing and propping of the formations by conventional means has proven to be generally unsuccessful and uneconomical. This is due to such factors as a low permeability and a low rock hardness in the presence of enough overburden pressure to create a high effective stress that tends to move the rock into an opening whenever the pressure within the opening is low enough to cause fluid to flow from the rock into the opening. These reservoirs are usually encountered at depths well below 3,000 feet and at temperatures well above 200° F. Such reservoir formations generally have a low permeability ranging from about 0.2 to about 50 millidarcies and are often overpressured reservoir formations in which the fluid pressures are significantly greater than the hydrostatic pressures. In such formations, wells completed by conventional casing and perforating techniques often become inoperative within a short time, due to a production of particles of earth-formation solids into the borehole and a subsequent collapse of the casing. Where such wells are treated by conventional fracturing and fracture propping techniques, an initial spurt of good productivity tends to quickly decline to little or no productivity.

Fluids contained in many tight, highly stressed reservoirs can be produced economically by utilizing conventional fracturing and/or acidizing treatments to increase the wall areas of permeable openings into the rock or to increase the effective diameters of the permeable openings. In a fracturing operation a propped fracture is formed within a reservoir rock by pressurizing a liquid that is confined by the rock until the fluid pressure exceeds a pressure corresponding to the sum of the least principal stress on the rock plus the tensile strength of the rock (the latter is usually insignificant relative to the former). Liquid that contains suspended granular propping material is pumped into the fracture so that the liquid is displaced into the fracture walls, and the propping material grains are left between the walls. As long as the fracture walls are kept open, the fracture provides a permeable opening that has a relatively large wall area. When the fluid pressure in the fracture is less than that in the rock, fluid will flow from the rock to the fracture at a rate that is generally the same for each unit of fracture wall area.

As wells have been extended to greater depths, at which higher stresses are applied to the reservoir rocks, and as wells have been completed into reservoirs in which the fluid pressures are abnormally high, it has become apparent that, in a significantly important class of such reservoirs, the fluids cannot be produced economically by means of the conventional treatments and procedures. In some such instances, when the fluid pressure within the boreholes or perforations through casings and cement have been reduced below those within the rocks by amounts sufficient to produce fluid from the rocks, the rocks have been displaced into the boreholes and the wells have become inoperative. In such a reservoir, the formation of a propped fracture serves only to produce an additional spurt of improved productivity that declines rapidly to substantially no productivity. In addition, an acidizing treatment is apt to aggravate the problem by dissolving some of the cementing material that tends to keep the rock from collapsing.

The soft, tight and highly stressed reservoirs are those in which a combination of low permeability, high stress and low rock hardness causes a propped fracture to close, by embedding the propping grains in the fracture walls when the fluid pressure within the fracture is lowered below that in the rock. In such a soft-rock reservoir the hardness of the rock forming the walls of the fracture is insufficient to prevent embedment of the grains of the propping material in response to the effective fracture closing load. It does not matter whether a fracture is oriented along a horizontal or a vertical direction, its formation resulted from a fluid pressure that exceeded the pressure that corresponds to the least principal stress on the rock. The direction along which the fracture forms is a direction that is perpendicular to the least principal stress. When the fluid pressure within the fracture is reduced, e.g., in order to produce fluid from the reservoir, the effective fracture closing load is equal to the amount by which the fluid pressure in the fracture is less than a pressure corresponding to the least principal stress. Where the reservoir permeability is low, the use of a relatively large pressure differential (drawdown) may be necessary in order to obtain an adequate rate of production from the reservoir.

Thus, generally in situations as described above, much of the troublesome performance is due to the instability of the walls of the openings through which fluids flow from the reservoirs into the boreholes. Where such wells are not fractured, the boreholes and/or casing perforations form openings that are generally cylindrical and have high ratios of open space to wall area. Such openings are subjected to high concentrations of stresses that tend to move the rocks into the openings. Since the permeability of the wall material is low, the wall material tends to be cracked off and entrained in the fluid that moves into the opening and through the opening into the borehole. The production of solids into the borehole of a well generally causes the well to become non-productive. Also, the effective diameters of such openings into the earth formations cannot be enlarged by an acidizing treatment. For one reason, at the relatively high temperatures at which such formations are usually encountered, the acidizing materials react so rapidly that they become spent before the effective diameters of the well openings have been increased. For another reason, the acidization may increase the failure and embedment problems by dissolving portions of the limited amount of natural-cementing material that is usually present in such formations.

When such earth formations are fractured and propped, the combination of a low rock hardness and a relatively high overburden pressure often results in an effective stress sufficient to cause the embedment of the fracture propping materials in the walls of the fractures. As the fracture propping materials are embedded, the walls move closer together until the fracture becomes closed and substantially impermeable.

An object of the present invention is to produce gases and liquids from tight high-pressured reservoir formations. Another object of the present invention is to fracture such formations and strengthen the walls of the fracture so as to prevent the embedment of propping agents and the closing of the fracture. Still another object of the present invention is to impregnate the walls of such fractures with resinous material capable of strengthening, consolidating and improving the permeability of the fractured formation and areas surrounding it and thereby improving the recoverability of fluids from the recovery formation zone. Still other objects of the present invention will be apparent from the following description.

It has now been discovered that the stability of such tight, high-pressured, soft-rock reservoirs can be improved by depositing a small amount of solid resin within the walls of a propped fracture in the reservoir rock. We found that, in spite of the low permeability and small size of the interconnecting pores in such a rock, when solid resin is deposited within the pores, in amounts that are less than enough to substantially plug the pores, a significant improvement is obtained in the resistance to the embedment of fracture propping grains in the walls of a propped fracture, and a significant increase is obtained in the rate at which fluid can be produced from the reservoir without causing the rock to collapse into the openings through which the fluid is withdrawn.

Not all resin-forming materials or techniques are suitable for depositing the resin within the walls of such fractures. Many such reservoirs are located at depths well below 3000 feet, where the temperatures are well above 200° F. and the times required to pump a liquid from a surface location to the fracture are relatively long. Since the permeabilities are seldom uniform within either the interior of such a fracture or the walls of such a fracture, sequentially injected slugs of fluid cannot be depended upon to uniformly contact and mix with each other within the walls of the fracture.

In accordance with the present invention, a resin-depositing treatment is utilized to improve the stability of a propped fracture in a reservoir in which a combination of low permeability, low rock hardness, and high compressive stresses tends to embed fracture propping grains in the fracture walls when the fluid pressure within a propped fracture is reduced to a pressure less than the fluid pressure in the reservoir rock. This treatment comprises a combination of the steps of:

(a) Opening a borehole into fluid communication with an earth formation that has a relatively low permeability of from about 0.2 to about 50 millidarcies and a combination of overburden pressure and rock hardness resulting in an effective stress capable of embedding fracture propping grains in the walls of a fracture when the pressure within the fracture is reduced;

(b) Forming and propping a fracture within the earth formation by suspending fracture propping materials in liquid that is mobile at the earth formation temperature, pumping the suspension into the fracture and displacing the liquid into the walls of the fracture;

(c) Flowing or injecting through the borehole and into the walls of the fracture, at least one liquid containing resin-forming liquefied reactants that are capable of remaining liquid while being injected at a temperature equaling that of the earth formation and are capable of reacting with each other within the walls of the fracture to form permeable intergranular-bonding solid resinous material. In the conduit that extends from a surface location to the fracture, the liquefied reactants are preferably disposed ahead of at least one fluid that has a viscosity substantially equaling that of the liquefied reactants at the temperature of the earth formation; and, (d) Maintaining said liquefied reactants within at least the near-surface portions of the walls of the fracture until the reactants have formed a permeable intergranular-bonding solid material within the fracture walls.

Various resin-forming materials can be used for improving the stability of propped fractures in formations such as phenolic resins, epoxy resins and the like and include those described in U.S. Patents 2,378,817; 2,476,015; 3,176,767; 3,176,769 and Br. 1,040,086 as well as those described in copending applications Ser. No. 507,983, filed Oct. 22, 1965, now U.S. Patent No. 3,351,386 and Ser. No. 475,094, filed July 27, 1965, now U.S. Patent No. 3,339,633, are acceptable for consolidating fractures encountered in tight high-pressured formations at great depth and where temperatures of 200° C. and higher are encountered.

The polyepoxides which are contemplated for use in forming resins of this invention are those organic compounds containing more than one vice-poxy group

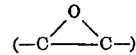

which can be incorporated in organic compounds which are saturated, unsaturated, aliphatic, cycloaliphatic, aromatic or heterocyclic. Often, these polyepoxides are described in terms of their epoxy equivalent value, that is the number of epoxy groups contained in the average molecule. This terminology and the types of polyepoxides useful in this invention are disclosed in U.S. Patent 2,633,458. More generally, the polyepoxides suitable for this invention are well known materials of commerce and many are described in the book "Epoxy Resins" by Lee and Neville, McGraw-Hill, New York, 1957.

Examples of some polyepoxides useful in the practice of this invention are the glycidyl polyethers of dihydric phenols which can be prepared by the condensation of dihydric phenols with epichlorohydrin in an alkaline medium. Polyhydric phenols which can be condensed with epichlorohydrin to form these polyepoxides are resorcinol, catechol, hydroquinone, methyl resorcinol and polynuclear phenols, such as 2,2-bis(hydroxyphenyl)-propane (Bisphenol A), 2,2-bis(4-hydroxyphenyl)butane, 4,4'-dihydroxy benzophenone, bis(4-hydroxyphenyl)-ethane, 2,2-bis(4-hydroxyphenyl)pentane, 1,5-dihydroxy-naphthalene, and the like. The above-mentioned polyhydric phenols may also contain halogen atoms and their condensation product with epichlorohydrin will contain the same.

The epoxide products obtained by the condensation of epichlorohydrin with these polyhydric phenols are not a single, simple molecule but a complex mixture of glycidyl polyethers having the well known terminal vic-epoxy groups. The epoxy equivalent can vary from 0 to relatively large numbers and/or fractions since the products are a mixture and may contain monomeric monoepoxides.

When the above-referred glycidyl polyethers have an epoxy equivalent from 1.0 to 2.1, the average molecular weight is somewhere between 250 to 900. However, the glycidyl polyethers which have an epoxy equivalent from 1.0 to 2.1 and a molecular weight between 350 and 400 can be used.

The polyamine curing agents for the polyepoxides described above are soluble polyamines, such as 1,2-diaminoethane, triethylamine, N,N-dicyclohexanolamine and so forth. The polyamines are preferred because it is necessary that the curing agent be generally insoluble in the overflushing liquid which is a predominantly aliphatic liquid hydrocarbon. In essence, the invention contemplates the use of polyamines which have a solubility of less than about 2–3 parts per 100 in the predominantly aliphatic liquid hydrocarbon used as the overflush (discussed more fully hereinafter).

It is also desirable that the polyamines have two or more amino functional groups which have at least one active hydrogen. Amines having the requistie characteristics also include sulfonyldianiline, 1,3-diaminobenzene, 4,4-methylene dianiline, diethylenetriamine and the like. A person skilled in the art can select other polyamines meeting the parameters set forth above from those well known in the art.

A particularly useful and desirable liquid for injecting into the walls of the fracture in steps (c) and (d) mentioned above is a polar-solvent containing from 10% to 50% of a polyglycidyl ether of a tetrahydroxy aryl compound, e.g., an alpha,alpha,omega,omega-tetrakis(hydroxyaryl)alkane resin formed in the presence of a diamino-aryl sulfone curing agent. In general the polyglycidyl ether compound and the diamino aryl sulfone curing agent are dispersed in a suitable polar-containing solvent vehicle such as lower aldehydes, ketones, ethers, esters, alcohols or mixtures of said polar-containing compounds are highly aromatic liquid hydrocarbons, e.g., toluene, benzene and aromatic petroleum hydrocarbons and the like. These vehicles are injected into the fracture formation and maintained therein so as to form permeable intergranular-bonding resinous solid material capable of consolidating said formation and inhibiting collapse of the formation on pressure changes or embedment of the propping agents in and around the fracture zone. Treatment of fractures by the process of this invention also significantly increases the stability of the walls of the openings through which fluids can flow from the reservoir formation into the borehole of a well. The resin treatment reduces the tendency of propping materials to become embedded in the walls of the fractures and reduces the tendency for grains or chips to become separated from the wall materials, etc. In order to accomplish such a resin treatment, the resin-forming materials of the present invention must comprise liquefied reactants that remain fluid while they are being flowed into the relatively hot reservoir environment and into the walls of the fracture. Also, in order to avoid failures due to the presence of untreated wall areas that can result in localized closures of the pore space or fracture, the resin-forming reactants of the present invention are displaced into the fracture walls by a fluid which has a viscosity substantially equaling that of the liquefied reactants at the reservoir temperature.

Although once the fractures have been established and propped, in tight high-pressured formations under discussion in order to recover fluids therefrom efficiently and economically, the consolidating resin, e.g., polyglycidyl ether derived from a tetraphenol cured in the presence of a diamino aryl sulfone curing agent, in a polar-containing solvent, can be injected into the fracture in a stepwise fashion, namely by (1) first injecting the resin followed by the curing agent or (2) the two materials can be injected simultaneously. In general, the resin-amino sulfone polymer mixed in the solvent vehicle is simultaneously injected into the fracture of the reservoir formation.

A preferred method of consolidation is denoted above by step (2). In addition, step (3) described below is employed. Step (3) consists of a preflush treatment with a suitable solvent which may contain a metal organic coupling agent and after injection of the consolidating fluid (step a or b) an overflushing fluid is injected into the fracture thereby overflushing the permeable resinous coated fracture with a liquid which is miscible with the solvent vehicle containing the resin but immiscible with the resinous compound, the sulfonyl-diamino curing agent and their polymer products.

The preferred polyglycidyl ethers of the invention are derived from tetraphenol which has two hydroxyaryl groups at each end of an aliphatic hydrocarbon chain which may be substituted if desired. The polyglycidyl ethers are obtained by reacting a mixture of the tetraphenol and epichlorohydrin or glycerol dichlorohydrin with an alkali metal hydroxide as more fully explained hereinafter. A variety of tetraphenols are used in preparing the polyglycidyl ethers although it is preferred to employ an alpha,alpha,omega,omega - tetrakis(hydroxyphenyl)alkane as is the case with such representative compounds as 1,1,2,2-tetrakis(hydroxyphenyl)ethane; 1,1,3,3-tetrakis(hydroxyphenyl)propane; 1,1,4,4 - tetrakis(hydroxyphenyl)butane; 1,1,5,5 - tetrakis(hydroxyphenyl)-3-methylpentane; 1,1,4,4 - tetrakis(hydroxyphenyl)-2-ethylbutane; 1,1,8,8-tetrakis(hydroxyphenyl)octane; 1,1,10,10-tetrakis(hydroxyphenyl)decane and the like as well as corresponding compounds containing neutral substituent groups in the chain as with 1,1,3,3-tetrakis(hydroxyphenyl)-2-chloropropane; 1,1,3,3 - tetrakis(hydroxyphenyl)-2-nitropropane; 1,1,4,4-tetrakis(hydroxyphenyl)-2,3-dibromobutane; 1,1,6,6-tetrakis(hydroxyphenyl)hexanol-2, etc. Besides including polyglycidyl ethers of the foregoing phenols, the invention also encompasses polyglycidyl ethers of similar tetraphenols having substituted hydroxyphenyl groups therein as well as polynuclear hydroxyaryl groups. Reference is made to polyglycidyl ethers of such typical compounds as 1,1,2,2-tetrakis(2-hydroxy-5-methylphenyl)ethane; 1,1,3,3-tetrakis(hydroxy-2,6-ditertiarybutylphenyl)propane; 1,1,6,6-tetrakis(3-chloro-4-hydroxyphenyl)hexane; 1,1,4,4-tetrakis(2-hydroxynaphthyl)butane and the like.

The tetraphenols used in preparing the polyglycidyl ethers are readily obtained by condensing the appropriate dialdehyde with a desired phenol. This condensation is affected by mixing a phenol and a dialdehyde together using a substantial excess of the phenol over the stoichiometric proportions of four moles of the phenol per mole of dialdehyde, saturating the mixture with hydrogen chloride, allowing the mixture to react for several days, and removing the unreacted phenol as by distillation, for example. The phenols condense with the dialdehydes so that the terminal carbon atom is linked to a nuclear carbon atom of the phenol, which nuclear atom is normally in a position from the class consisting of 2 and 4 with respect to the phenolic hydroxy group.

The preferred polyglycidyl ethers may be also prepared by adding the tetraphenol to epichlorohydrin using the latter in a ratio of about 2 to 10 molecules of epichlorohydrin per phenolic hydroxyl group of the phenol, and then adding an alkali metal hydroxide such as sodium or potassium hydroxide so as to effect the desired etherification reaction. It is convenient to dissolve the tetraphenol in the substantial stoichiometric excess of epichlorohydrin and heat the mixture to about reflux temperature. Aqueous sodium hydroxide, such as about a 15% to 50% solution, is then added gradually with boiling of the reaction mixture. The water added with the caustic and formed in the reaction is removed by distillation azeotropically with epichlorohydrin. Condensed distillate separates into an upper aqueous phase and a lower epichlorohydrin phase, which latter phase is returned as reflux. It is desirable to add the caustic and conduct the distillation at rates so that the reaction mixture contains at least about 0.5% water in order to have the etherification reactions progress at a reasonably rapid rate. The sodium hydroxide is added in amount that is equivalent on stoichiometric basis to the quantity of starting tetraphenol, or a small excess thereof such as 3% to 5%. Upon completion of the caustic addition and the etherification reactions, unreacted epichlorohydrin is separated by distillation. The residue consisting primarily of the polyglycidyl ether and salt has added thereto a mixture of equal volumes of toluene and butanone. This solvent mixture dissolves the ether, but not the salt which is removed by filtration. The filtrate is then distilled to separate the solvent and leave the desired polyglycidyl ether.

The polyglycidyl ethers of tetraphenol are generally solid epoxy resins at 25° C. and have more than one of the hydrogen atoms of the phenolic hydroxyl groups of the tetraphenol replaced by a glycidyl radical in the average molecule. Usually, the average molecule contains about 3 to 4 glycidyl radicals. Other groups in the ether besides a possible very small amount of unetherified phenolic hydroxy groups, are dihydroxy glyceryl radicals and chlorohydroxy radicals which likewise are substituted in place of hydrogen atoms of phenolic hydroxyl groups of the initial tetraphenol. The polyglycidyl ethers are soluble in lower aliphatic ketones as well as in mixtures of an aromatic hydrocarbon containing a substantial proportion of such lower ketones.

These resins when cured with sulfonyldiamino compounds, e.g., sulfonyl dianiline, sulfonyl N-butyl-p-phenyl diamine, sulfonyl N-propyl-p-phenylene diamine and the like are unusual in retaining excellent hardness and good strength at elevated temperatures.

A particularly preferred solution useful in consolidation of fractures is available from Shell Chemical Company under the name of "EPON Resin 1031-B-80" which is a solution of a mixture of isomers and homologues having the structure as follows:

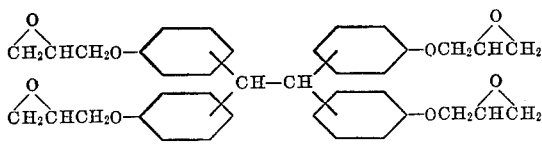

in methylethyl ketone.

The above epoxy compounds cured with sulfonyl dianiline or the like in a suitable solvent, e.g., acetone or methylethyl ketone, consolidate fractures in a particularly effective manner.

In carrying out the process of this invention, the polyglycidyl ether compounds and sulfonyl polyamines are usually mixed at a surface location in the desired proportions. It is usually preferred that they be mixed in stoichiometric relationships for the best results. The polyglycidyl ether compound is generally a viscous liquid and when it is mixed with the sulfonyl polyamine, polymerization and its viscosity is greatly increased. Since it would be very difficult to inject such viscous liquid into the pores of the formation and even if possible, it would be undesirable since it could lead to complete plugging of the pore space so injected; it is desirable to use a suitable solvent vehicle to reduce the viscosity of the mixture to more desirable levels. Therefore, since relationships exist between the resin amino polymer, the solvent vehicle and the overflushing fluid if one is used, it is reasonable that they be administered with care. Basically, if an overflush fluid is used, the polymer mixture and its components must be insoluble in the overflushing fluid, but soluble initially in the solvent vehicle containing the resin-amino sulfone compounds. Also, the overflushing liquid must be miscible with the solvent vehicle so that it can effect the partition of the polymer-rich phase and extract the solvent vehicle therefrom.

In view of the above parameter, solvent vehicles must be carefully selected and include lower ketones, aldehydes, alcohols, ethers, esters such as methyl acetate, amyl acetate, acetone, methyl ethyl ketone, epichlorohydrin, styrene oxide, phenyl glycidyl ether, alkyl glycidyl ether. Also benzene, toluene, aromatic petroleum hydrocarbons and the like can be used above or preferably as mixtures with the polar-containing solvents.

It is often desirable to prepare the fracture and surrounding area to be consolidated by removing the residual oil and water therefrom. This can be accomplished by injecting into the reservoir a light hydrocarbon, such as diesel oil, to remove the crude oil and an alcohol to remove the water. Techniques such as these and similar ones are well known in the art and in the preparation of the reservoir it is usually desirable that it be wet with a light hydrocarbon when the solution containing the epoxyamino resin is injected. Also, a spacer fluid consisting of a light hydrocarbon, such as diesel oil, and about 10% by weight of the solvent used as the vehicle is sometimes desirable to prevent removal of the solvent vehicle from the resin solution when it is injected. For the most part, the preflushes can be accomplished with 1 to 3 pore volumes of the portion being consolidated of the fluid used for oil or water removal. Usually 1 pore volume of the spacer fluid is satisfactory.

Also, it may be desirable to incorporate metal organic coupling agents in the preflush fluids to improve the strength of the consolidations with the polyepoxide and amine polymer. Such coupling agents act as "links" between the loose earthen material and the epoxy-amino polymer.

Preferably, the metal organic coupling agent is an organofunctional silane which should be understood as being a polyfunctional organic substance containing at least one silicon atom having one functional group suited for reaction with the particles of the mass to be consolidated and another functional group suitable for reacting with one of the components of the polyepoxide and polyamine polymer. An example of an organofunctional silane is an "amino-functional silane" or an "epoxyfunctional silane."

Especially if the materials to be consolidated contain large amounts of siliceous grains, such as sand, the functional groups suitable for reacting with the grains of the mass to be consolidated are preferably alkoxy groups, such as methoxy or ethoxy groups. Examples of useful aminofunctional silanes are:

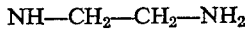

and (N-aminoethyl-aminopropyltriethoxy-silane)

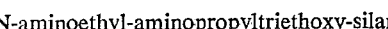

(aminopropyltriethoxy-silane)

Further, the following are examples of epoxy-functional silanes:

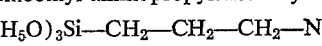

and (glycidoxypropyltrimethoxy-silane)

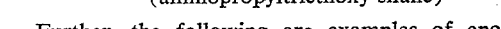
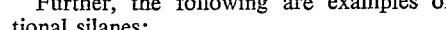
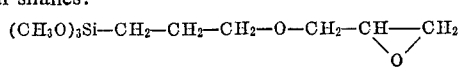

(3,4-epoxycyclohexylethyltrimethoxy-silane)

The presence of even small amounts of such metal organic compounds in the consolidation made according to this invention results in highly superior strengths. It is generally preferred that these metal organic compounds be present in concentrations of 1% or less by volume of the solution which is used as a vehicle to introduce them into the portion to be consolidated. In fact, concentrations less than 1% by volume are extremely useful and a very satisfactory range is from 0.25% to 1% by volume of the preflush fluid used to introduce them into the reservoir.

Subsequent to the injection of the polyglycidyl etheramino sulfone containing solution into the reservoir, it is desirable to overflush the fracture with the overflushing liquid. This overflushing liquid should meet certain requirements which are: (1) that the resinous materials, curing agents and their reaction products be virtually insoluble in the overflushing liquid, and (2) that the solvent vehicle for the polyglycidyl ether aryl amino sulfone mixture be miscible in the overflushing liquid.

Liquids meeting these requirements are the predominantly aliphatic hydrocarbon fractions of petroleum crudes, such as brightstock oils, diesel oil and the like. For example, a 1:1 mixture of brightstock and No. 2 diesel oil makes a good overflushing liquid.

The importance of the overflushing technique is that it partitions the resinous polymer from the solvent vehicle and subsequently extracts much of the remaining solvent vehicle from the polymer-rich phase formed on partition.

The consolidation of fractures in reservoir formations at 300° F. to 450 F. can be illustrated by the following procedure:

(1) Flush the formation with 3 pore volumes of a 1:1 mixture of No. 2 fuel oil or the kerosene type of fuel (Shell "Dieseline–50") and an aromatic extract from heavy hydrocarbon solvent boiling range 400–500° F. having approximately 60% aromatics (Shell "Cyclo Sol 73") and follow with 3 pore volumes of isopropyl alcohol or acetone.

(2) Flush the formation with 1 pore volume of a 10% mixture of acetone in Shell "Dieseline–50" containing 0.5% A–1100 (an amino-functional silane) made by Union Carbide.

(3) Flush the formation with ⅔± pore volume of resin mix containing the following:

(a) acetone—26% (w.).
(b) diamino diphenyl sulfone—5.5% (w.).
(c) EPON 1031–B–80—68% (w.).

The density of this mixture is about 8.7 lb./gal. at ambient conditions. Viscosity of the freshly prepared mixture as a function of temperature and pressure is shown in FIGURE 1.

Figure 2:
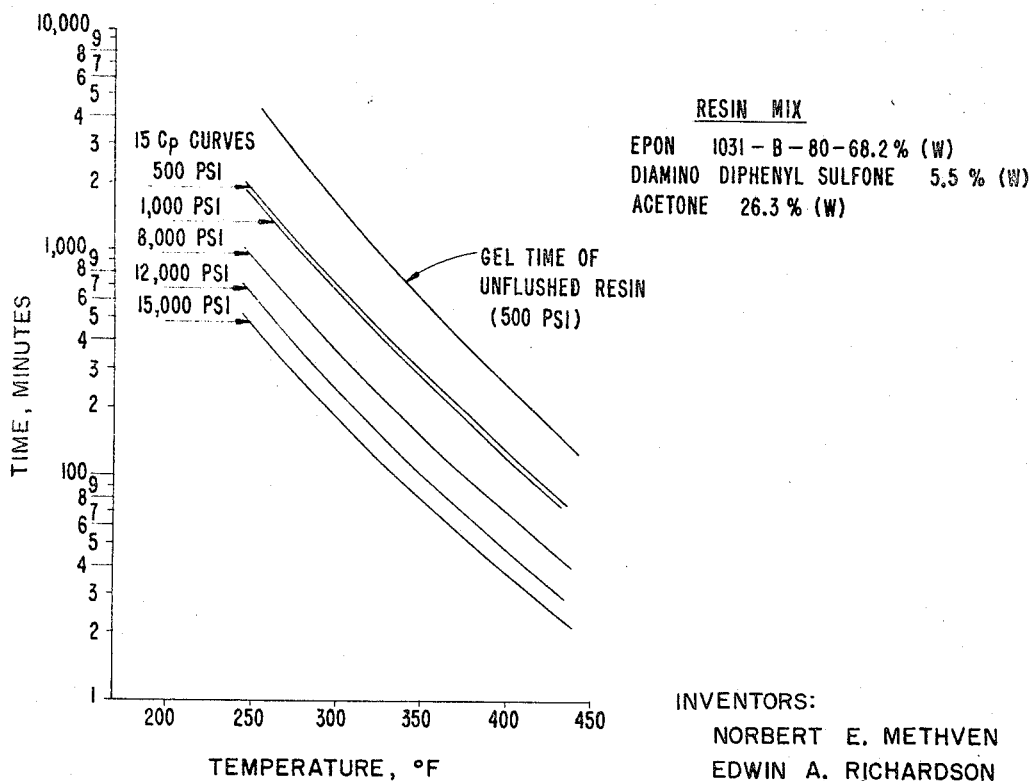
Figure 3:
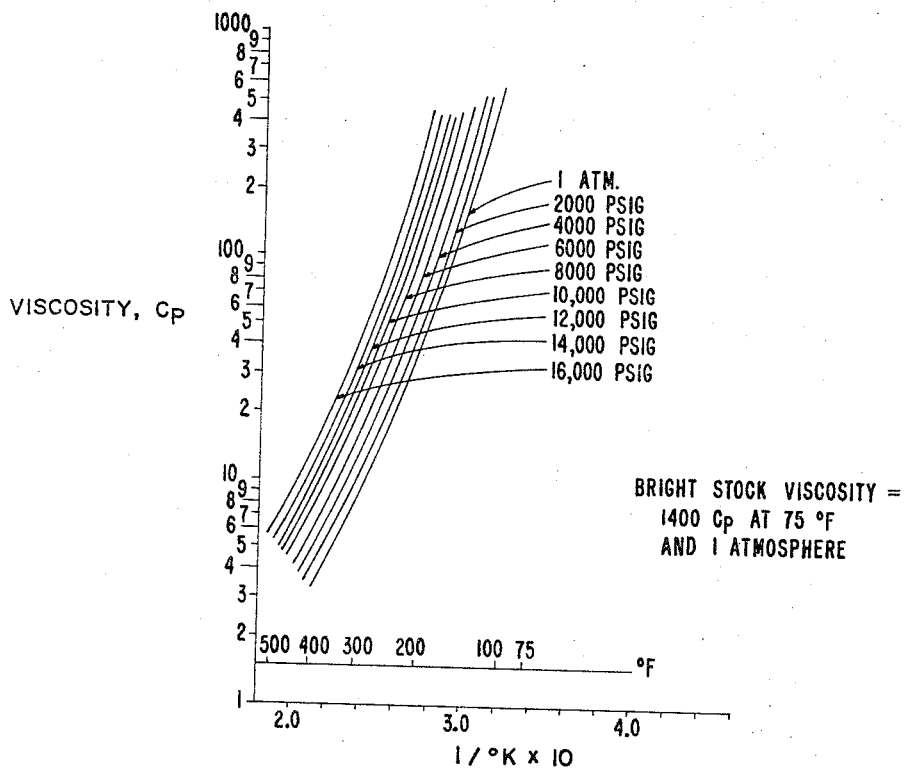

(4) Immediately flush the formation with 3 to 6 pore volumes of Shell "Valvata Oil 79" (brightstock). Time available as a function of temperature and pressure is indicated in FIGURE 2. The viscosity of brightstock as a function of temperature and pressure is shown in FIGURE 3.

(5) Shut in well to allow hardening of the resin before producing. Time required as a function of temperature at 500 p.s.i. pressure is given in FIGURE 4.

FIGURE 2 shows the dependence of viscosity of the above resin mix on time, temperature and pressure. Plugging can occur if the resin mix is allowed to reach a viscosity higher than about 15 cp. at bottomhole conditions before overflushing or about ½ the time required to gel the unflushed resin. Therefore, the 15 cp. curves given in FIGURE 2 represent the approximate amount of time available to complete the overflush once the resin solution reaches bottomhole conditions.

Figure 4:
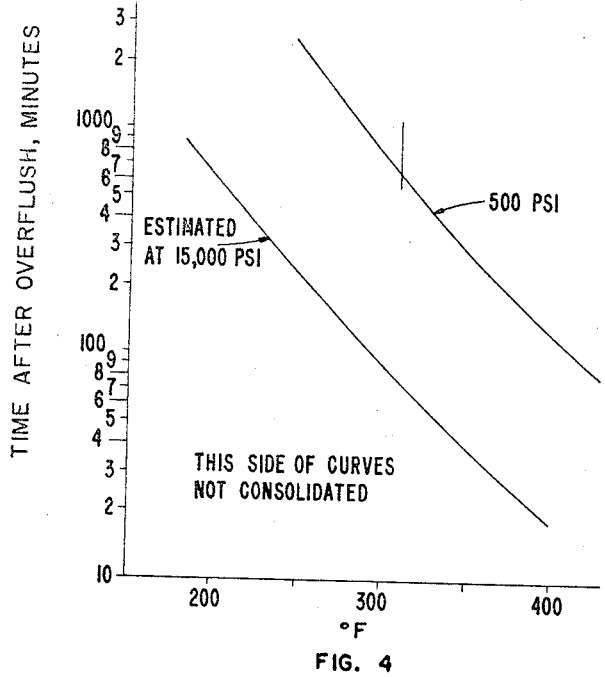

FIGURE 4 gives the time required as a function of temperature for the resin mix to harden after overflushing. If the bottomhole temperature (curing temperature) is not known with much certainty, a considerable safety factor should be allowed by keeping the well shut-in an additional period before producing. An additional safety factor accrues from the fact that the pressure in most cases will far exceed the value of 500 p.s.i. used in FIGURE 4 (see the curve estimated at 15,000 p.s.i.).

Thus, FIGURES 1–4 graphically show the essence of the present invention in which FIGURE 1 shows the relationship of the viscosity of the resin as a function of temperature at two different pressures; and FIGURE 3 shows the relationship of viscosity of bright stock as a function of temperature at different pressures; FIGURE 4 shows the relationship of time required for handling of the resin as a function of temperature at two different pressures and FIGURE 2 shows the dependence of viscosity of the resin mixture as shown on time, temperature and pressure.

The method of consolidating fractures and loose sand around a well bore is particularly applicable in the 300° to 450° F. range and is also applicable in clean sandstones as well as in dirty sandstones.

The following procedure was used in fracture treatment of a well in Colorado County, Tex., having the following status:

Elevation. DF 166' TD—16,500'; PBTD—15,750'.
Casing: 7⅝" at 11,148'.
Production Liners: 5½" 23# P–110 FJ from 11,001' to 14,498'; 3½ 13.3# P–110 FJ from 14,288' to 15,912'.
Production Tie-Back: 5½" 26# SOO–95 from 0 to 8,000'; 26# P–110 from 8,000' to 11,001'.
Tubing: 2⅞" 10.7# C–75 PH–6 from 0–8,000'; 7.9# P–105 PH–6 from 8,000'–14,180'; 2 jts. 10.7# C–75 PH–6 to 14,240'; 2⅜" 4.7# FJ Production Tube below packer to 15,685'.

*Procedure*

(1) After running wireline tools to insure that no fill exists within perforated intervals, pump into tubing 75 bbls. fresh water followed by a solution consisting of 18 bbls. of a 50/50 mixture of Shell "Dieseline–50" and Shell "Cyclo Sol 75" then follow with 18 bbls. of isopropyl alcohol.

(2) Pump into tubing a 6 bbl. solution consisting of 5.4 bbls. of Shell "Dieseline–50", 0.6 bbl. acetone and 1.25 gal. Union Carbide A–1100 (amino-functional silane).

(3) Place a tubing wiper plug following the material.

(4) Pump in a 6 bbl. mixture consisting of three 500 lb. drums of EPON 1031–Z–80, 2.1 bbl. acetone and 121 lbs. of diamino diphenyl sulfone.

(5) A tubing wiper plug was placed following this mixture.

(6) Pump into tubing 24 bbls. of heated Shell "Valvata Oil 79."

(7) Displace contents of tubing with 73 bbls. of Shell "Dieseline–50."

(8) Shut well in for four hours.

(9) The well was placed on production. The well was tested at rates up to 1,252,000 cubic feet of gas per day with a tubing pressure of 4300 p.s.i. The well produced fluids, e.g., gas, effectively for many months with no evidence of sand or rocks.

We claim as our invention:

1. A process of stabilizing an opening within a fracture in a relatively tight, hot, high-pressured reservoir formation which comprises—
 (a) displacing a suspension of fracture propping material through the well conduits and into a fracture in a tight, high-pressured reervoir formation at a depth below about 3,000 feet and a temperature above about 220° F,
 (b) dissolving a mixture of polyglycidyl ether of a tetraphenolic compound and sulfonyl diamino aryl compound in a solvent to form a substantially clear solution of components which form a solid resin after several hours exposure to the reservoir formation temperature,
 (c) mixing selected predominantly aliphatic hydrocarbon fractions of petroleum compounds that form a liquid mixture having a viscosity at least substantially equal to that of the solution of resin forming components at the reservoir formation temperature, and
 (d) displacing the solution of resin forming components through the well conduits and into the walls of the fracture as a liquid displaced by the mixture of aliphatic hydrocarbon fractions.

2. A process according to claim 1 wherein the fractures are pretreated with flushing fluids prior to injection of the resinous liquid consolidation to remove naturally occurring oil and water in said portion of said fractures.

3. A process according to claim 2 wherein the flushing fluids contain organo-functional silanes to enhance the strength of the subsequent consolidation.

4. A process according to claim 3 wherein the organo-functional silanes are selected from the group consisting of amino-functional silanes and epoxy-functional silanes.

5. A process according to claim 2 wherein the solvent vehicle is a mixture of acetone and methyl ethyl ketone and the overflushing liquid is a predominantly aliphatic liquid hydrocarbon in which the polymerizing mixture of polyglycidyl ether of 1,1,2,2-tetrakis(hydroxyphenyl)ethane and diamino diphenyl sulfone is substantially insoluble.

6. A process according to claim 1 wherein the polymerizing resin is derived from a polyglycidyl ether of tetraphenol and diamino diphenyl sulfone dispersed in a solvent vehicle selected from the group consisting of acetone, methyl ethyl ketone and mixtures thereof.

7. A process according to claim 1 wherein the fracture of the reservoir being consolidated is pre-treated with flushing fluids to remove naturally occurring water and oil from said portion prior to the injection of the solution of the polymerizing mixture of 1,1,2,2-tetrakis(hydroxyphenyl)ethane in the solvent vehicle.

References Cited

UNITED STATES PATENTS

| | | | |
|---|---|---|---|
| 3,100,527 | 8/1963 | Hilton et al. | 166—33 |
| 3,176,767 | 4/1965 | Brandt et al. | 166—33 |
| 3,176,769 | 4/1965 | Treadway et al. | 166—33 |
| 3,297,086 | 1/1967 | Spain | 166—33 |
| 3,297,087 | 1/1967 | Spain | 166—33 |
| 3,302,718 | 2/1967 | Prats et al. | 166—33 |
| 3,339,633 | 9/1967 | Richardson | 166—33 |
| 3,343,600 | 9/1967 | Phansalkar et al. | 166—33 |

STEPHEN J. NOVOSAD, *Primary Examiner.*